United States Patent
Hussein et al.

(10) Patent No.: US 8,148,481 B2
(45) Date of Patent: Apr. 3, 2012

(54) METHOD FOR SEED BED TREATMENT FOR A POLYMERIZATION REACTION

(75) Inventors: F. David Hussein, Cross Lanes, WV (US); Mark G. Goode, Hurricane, WV (US); Michael E Muhle, Kingwood, TX (US); David A. Yahn, Singapore (SG); Robert O. Hagerty, Wyckoff, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/128,087

(22) PCT Filed: Dec. 17, 2009

(86) PCT No.: PCT/US2009/068439
§ 371 (c)(1),
(2), (4) Date: May 6, 2011

(87) PCT Pub. No.: WO2010/071798
PCT Pub. Date: Jun. 24, 2010

(65) Prior Publication Data
US 2011/0294973 A1 Dec. 1, 2011

Related U.S. Application Data

(60) Provisional application No. 61/203,064, filed on Dec. 18, 2008.

(51) Int. Cl.
*C08F 2/00* (2006.01)
*C08F 2/34* (2006.01)
*C08F 10/02* (2006.01)

(52) U.S. Cl. .............. 526/88; 526/68; 526/901; 526/905

(58) Field of Classification Search ................... 526/68, 526/88, 901, 905
See application file for complete search history.

(56) References Cited

U.S. PATENT DOCUMENTS

| 5,324,800 | A | 6/1994 | Welborn, Jr. et al. |
| 5,712,352 | A | 1/1998 | Brant et al. |
| 5,763,543 | A | 6/1998 | Muhle et al. |
| 2003/0181605 | A1* | 9/2003 | Abe et al. .......... 526/68 |
| 2007/0073012 | A1 | 3/2007 | Pannell et al. |

FOREIGN PATENT DOCUMENTS

| EP | 0179666 A1 | 4/1986 |
| EP | 0605002 A1 | 7/1994 |
| EP | 781300 | 7/2001 |
| WO | WO 96/08520 | 3/1996 |

* cited by examiner

*Primary Examiner* — Fred M Teskin

(57) ABSTRACT

A method for preparing a reactor for performance of a polymerization reaction, the method including providing at least one seed bed into the reactor; wherein the at least one seed bed includes at least one organometallic compound and polymer particles.

19 Claims, 1 Drawing Sheet

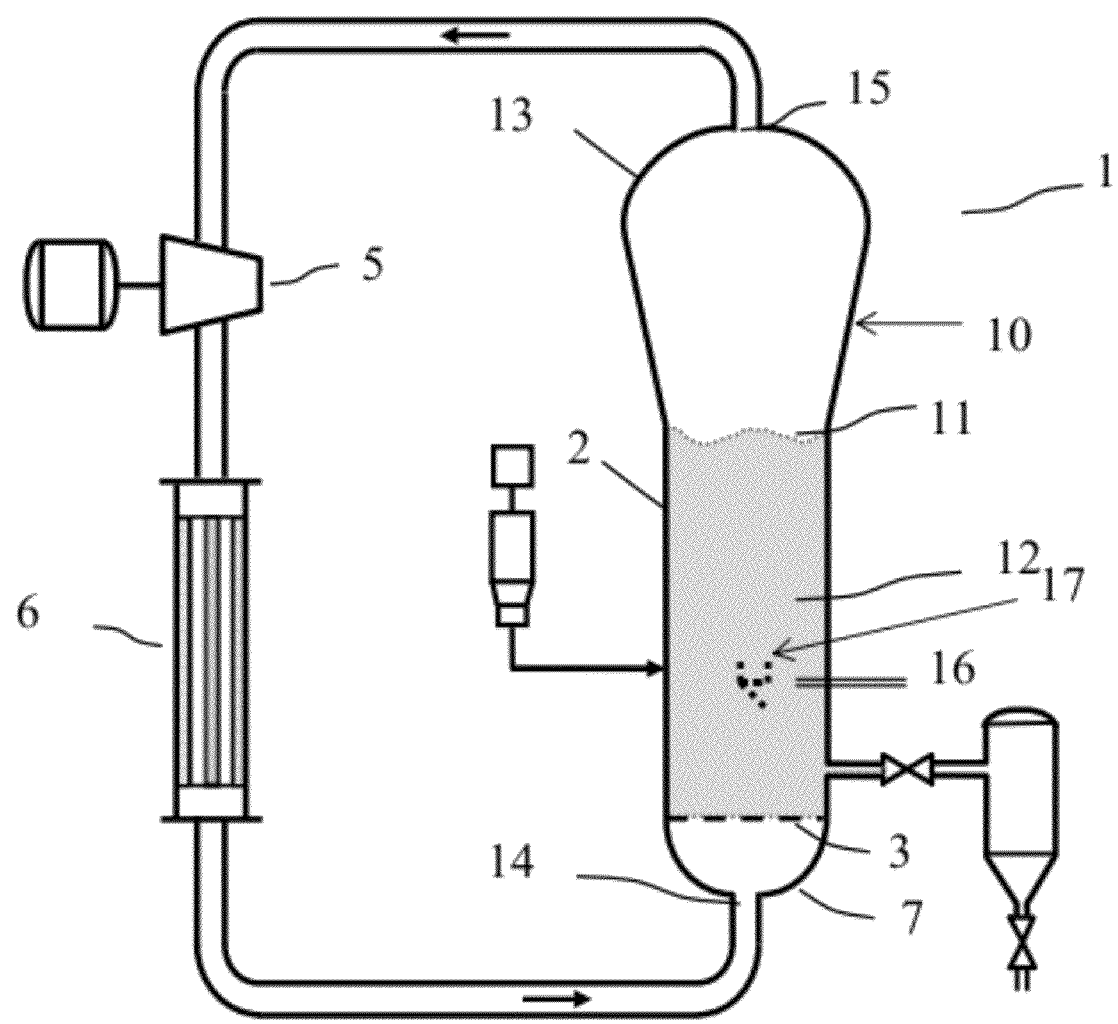

METHOD FOR SEED BED TREATMENT FOR A POLYMERIZATION REACTION

CROSS REFERENCE TO RELATED CASES

This application is a National Stage application under 35 U.S.C. 371 of International Application No. PCT/US2009/068439, filed Dec. 17, 2009, that claims the benefit of U.S. provisional application Ser. No. 61/203,064, filed Dec. 18, 2008, the disclosures of which are incorporated by reference in their entireties.

FIELD OF THE INVENTION

The disclosure relates to methods for seed bed treatment prior to a polymerization reaction, for example, prior to an olefin polymerization reaction with a metallocene catalyst.

BACKGROUND

A common process for producing polyolefin polymers is a gas phase polymerization process. For any polymerization process, the catalyst system employed is typically of great importance. A catalyst system generally includes at least one catalyst and at least one co-catalyst. Organometallic compounds such as metal alkyls are well known for use in this area. They are commonly used as "cocatalysts" (or catalyst "activators") with Ziegler-Natta catalysts. Examples of cocatalysts include the use of triethylaluminum (TEAl) and trimethylaluminum (TMA).

Metal alkyls have also been used with advanced catalysts such as metallocene catalysts. With metallocene catalysis, the metal alkyl has at least two roles: (1) activating the catalyst; and (2) eliminating impurities from the reaction medium. With respect to activation of the metallocene catalyst, unlike Ziegler-Natta catalysts as referenced above, the common, low molecular weight metal alkyls, such as TEAl, TMA, and DEZ, are not effective in activating metallocene catalysts. Rather, high molecular weight metal alkyls, such as methylaluminoxane (MAO), are often used.

For example, U.S. Pat. No. 5,324,800 discloses the use of MAO with metallocene catalysts. Low molecular weight metal alkyls may be used to scavenge impurities such as moisture and oxygen from the reaction medium. This has the effect of eliminating the catalyst poisons from the system and thereby maximizing the catalyst productivity.

WO 1996/008520 discloses metallocene catalysis using less than 300 ppm of an organometallic scavenger for reactor start-up, and then discontinuing the introduction of the scavenger (or reducing the rate of introduction) such that the concentration of oligomers in the product is maintained at less than 50 ppm by weight.

EP 7 81 300 discloses a continuous polymerization process with metallocene catalysts using less than 50 ppm of an organometallic scavenger based on bed weight.

U.S. Pat. No. 5,712,352 discloses a metallocene polymerization process using less than 30 ppm of an organometallic scavenger. The patent also describes the introduction of scavenger during the start-up process with the subsequent removal of at least 95% of the scavenger prior to the introduction of catalyst. Additionally, the patent describes the problems that may occur when too much scavenger is used such as, for example, generation of fines in the fluid bed and the production of high levels of $C_{14}$-$C_{18}$ oligomers in the resin product.

U.S. Pat. No. 5,763,543 discloses a metallocene polymerization process using less than 300 ppm of an organometallic scavenger for reactor start-up, and then discontinuing the introduction of scavenger once the catalysts productivity reaches 2500 or higher.

In addition to choosing desirable components for a catalyst system, reactor start-up is an important aspect for reactor continuity and operability. For example, during a gas phase polymerization process, a fluidized bed reactor may contain a fluidized dense-phase bed including a mixture of reaction gas, polymer (resin) particles, a catalyst system, and optionally, catalyst modifiers or other additives. Before such a polymerization reaction begins, a "seed bed" is typically loaded into the reactor, or is present in the reactor from a previous polymerization. The seed bed typically consists of granular material that is or includes polymer particles. The polymer particles need not be identical to the desired end product of the reaction.

For example, U.S. Patent Application Publication No. 2007/0073012 discloses a method for preparing a reactor for performance of a polymerization reaction in the reactor, said method including the steps of: (a) loading a seed bed into the reactor; and (b) loading at least one continuity additive into the reactor. Examples of the at least one continuity additive are aluminum stearate, other metal stearates, and ethoxylated amines. Such methods have improved the efficiency and operability of the polymerization reaction especially during the critical initial stage(s) of a polymerization reaction (before the reaction has stabilized).

However, further improvements in efficiency and operability of the polymerization reaction are needed. Particularly, there is a continued need to address the vulnerability of the reactor to sheeting and/or fouling during the critical initial stage(s) of the polymerization reaction.

Sheeting is a phenomenon during which catalyst and resin particles adhere to the reactor walls or a site proximate the reactor wall possibly due to electrostatic forces. If the catalyst and resin particles remain stationary long enough under a reactive environment, excess temperatures can result in particle fusion which in turn can lead to the formation of undesirable thin fused agglomerates (sheets) that appear in the granular products. The sheets of fused resin vary widely in size, but are similar in most respects. They are usually about ¼ to ½ inch thick and are about 1 to 5 feet long, with some sheets being even longer. Sheets may have a width of about 3 to 18 inches or more. The sheets are often composed of a core of fused polymer that may be oriented in the length dimension of the sheets and their surfaces are covered with granular resin fused to the core. The edges of the sheets can have a hairy appearance from strands of fused polymer.

In gas phase reactors, sheeting is generally characterized by the formation of solid masses of polymer on the walls of the reactor. These solid masses of polymer (e.g., the sheets) eventually become dislodged from the walls and fall into the reaction section, where they interfere with fluidization, block the product discharge port, plug the distributor plate, and usually force a reactor shut-down for cleaning, any one of which can be termed a "discontinuity event", which in general is a disruption in the continuous operation of a polymerization reactor. The terms "sheeting, chunking and/or fouling" while used synonymously herein, may describe different manifestations of similar problems, in each case they can lead to a reactor discontinuity event.

There are at least two distinct forms of sheeting that occur in gas phase reactors. The two forms (or types) of sheeting are described as wall sheets or dome sheets, depending on where they are formed in the reactor. Wall sheets are formed on the walls (generally vertical sections) of the reaction section.

Dome sheets are formed much higher in the reactor, on the conical section of the dome, or on the hemi-spherical head on the top of the reactor.

SUMMARY

In one aspect, a method for preparing a reactor for a polymerization reaction is proved. The method comprises providing at least one seed bed in the reactor; wherein the at least one seed bed comprises at least one organometallic compound and polymer particles. In some embodiments, the organometallic compound may be diethyl zinc (DEZ).

The method may further comprise contacting the seed bed, as described above, with a catalyst system and one or more olefin monomers to produce a polyolefin product In another aspect, a reactor system for producing polyolefin polymers is provided, wherein the reactor system comprises at least one reactor and the seed bed, prepared as described above.

BRIEF DESCRIPTION OF THE DRAWINGS

FIG. 1 is a schematic representation of an exemplary reactor system that may be used with several embodiments.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Optional or optionally means that the subsequently described event or circumstance may or may not occur, and that the description includes instances where said event or circumstance occurs and instances where it does not.

As used herein, a seed bed is typically a starting material comprising a granular polyolefin resin made from any polyolefin using a catalyst system, for example, such as Ziegler-Natta, a chromium containing catalyst, a metallocene catalyst, a Group 15 atom and metal containing catalyst, or mixtures thereof, including bimetallic and mixed catalyst systems. The seed bed resin may have narrow or wide range of particle size distribution. The seed bed may or may not have the same polymer properties as of the polymer to be produced later. The seed bed material is usually stored in silos or hopper cars and hence may be exposed to air and moisture in some embodiments. An example of using a seed bed before a polymerization process may be found in U.S. Patent Application Publication No. 2007/0073012.

As used herein, "bulk density depression" refers to the fluidization quality of the reactor system. With some catalysts, for example, metallocene catalysts especially during start-up, the fluidized bulk density (FBD) decreases. The drop in fluidized bulk density is at times severe. The drop in fluidized bulk density during this start-up stage usually leads to instability because the drop in FBD leads to a drop in the bed weight and can lead to a loss in bed level control if the instrumentation does not perform properly. In some embodiments, the method herein provides a polymerization reaction in which there is substantially no bulk density depression. By "substantially no bulk density depression" it is meant that the fluidized bulk density dropped by less than 3 lb/cf during the start-up stage.

As used herein, "wall skin thermocouples" refers to thermocouples that measure the temperature of the bed close to reactor wall (i.e., within ¼ inch from the wall). When the reactor is operating continuously, the wall skin thermocouples reading will be very close to the bulk reactor temperature or just slightly lower by 1-2° C. lower. A reading above bed temperature indicates that a layer of resin and/or catalyst are reacting causing hot temperatures or temperatures above continuous reactor operation that may result in sheeting.

As used herein the expression that a reactor is "pre-load(ed)" or "load(ed)" with at least one material as described in more detail below such as at least one organometallic compound (or one or more materials) denotes that the material is loaded into the reactor or is merely present before the start of the polymerization reaction or process (for example, wherein the seed bed is made in-situ before the reaction or process). As used herein for convenience, the two may be used interchangeably in several embodiments, as well as, "provide(d)" may be used to cover all embodiments of loading and pre-loading.

An example of pre-loading may be found in U.S. Patent Application Publication No. 2007/0073012. Due to its function, a seed bed in a reactor is always "pre-loaded" in the reactor in the sense that it is loaded prior to and in preparation for a reaction which may or may not subsequently occur (in contrast with being loaded at or after the start of the reaction). Pre-loading is typically accomplished by loading a seed bed (typically consisting essentially of granular material but generally polymer particles) into a reactor before the start of a polymerization reaction.

In some embodiments, the seed bed may be loaded to the reactor and subjected to purging at a given temperature using an inert to remove oxygen and some residual moisture prior to further treatment.

Alternatively, loading may be accomplished by treating a seed bed existing in a reactor (e.g., one from a previous polymerization operation) with one or more materials before the start of a new polymerization reaction. The seed bed may be from a polymerization reaction that used the same or a different catalyst system as the catalyst system to be employed in the new polymerization reaction as well as the same or different monomer types.

In some embodiments, a specific amount of one or more materials is loaded into a reactor based on the weight of a seed bed in (or to be loaded into) the reactor. In general, embodiments can include any of the steps of: loading the one or more materials into a reactor and then loading a seed bed into the reactor; loading a seed bed into a reactor and then loading the one or more materials into the reactor; simultaneously loading the one or more materials and a seed bed into a reactor; and combining (e.g., mixing) a seed bed with the one or more materials and then loading the combination into a reactor.

In any of the embodiments disclosed herein, the one or more materials (as described in more detail below) may be loaded into a reactor in any of a number of different ways, including by: pretreatment of a seedbed in the reactor with the one or more materials; introduction of the one or more materials with (and during) loading of a seed bed into the reactor; introduction of the one or more materials during the reactor condition build-up stage; introduction of the one or more materials directly into the seed bed via a tube inserted into the seed bed (e.g., through a support tube); and/or introduction of the one or more materials via a carrier, for example, such as a liquid or a pressurized gas, into the reactor.

In several classes of embodiments, the method includes the pretreatment of the seed bed prior to initiation of polymerization with at least one organometallic compound and, optionally, with an inert hydrocarbon such as isopentane.

Catalyst System
Conventional Catalysts

Conventional catalysts are traditional Ziegler-Natta catalysts and Phillips-type chromium catalysts known in the art. Examples of conventional-type transition metal catalysts are disclosed in U.S. Pat. Nos. 4,115,639, 4,077,904 4,482,687, 4,564,605, 4,721,763, 4,879,359 and 4,960,741. Conventional-type transition metal catalyst compounds that may be used include, but are not limited to, transition metal compounds from Groups III to VIII of the Periodic Table of the Elements. Reference in this section to the Periodic Table of the Elements refers to the Periodic Table of the Elements, published and copyrighted by the International Union of Pure and Applied Chemistry, Inc., 2004. Also, any reference to a Group or Groups shall be to the Group or Groups as reflected in this Periodic Table of the Elements using the IUPAC system for numbering groups.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$. Other suitable catalysts are described in, U.S. Pat. Nos. 4,302,565 and 4,302,566 and in British Patent Application 2,105,355.

Conventional-type chromium catalyst compounds, often referred to as Phillips-type catalysts, suitable for use may include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,242,099 and 3,231,550.

Still other conventional-type transition metal catalyst compounds and catalyst systems suitable for use include those disclosed in U.S. Pat. Nos. 4,124,532, 4,302,565, 4,302,566 and 5,763,723 and EP Publications EP-A2 0 416 815 and EP-A10 420 436.

Conventional-type cocatalyst compounds for the above described conventional-type transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethyl zinc, tri-n-butylaluminum, diisobutyl ethylboron, diethylcadmium, di-n-butylzinc and tri-n-amylboron, and, in particular, the aluminum alkyls, such as tri-hexylaluminum, triethylaluminum, trimethylaluminum, and tri-isobutylaluminum. Conventional-type organometallic cocatalyst compounds are known to those in the art and a more complete discussion of these compounds may be found in U.S. Pat. Nos. 3,221,002 and 5,093,415.

Metallocene Catalysts

Metallocene or metallocene-type catalyst compounds generally contain one or more ligands including cyclopentadienyl (Cp) or cyclopentadienyl-type structures or other similar functioning structure such as pentadiene, cyclooctatetraendiyl, and imides. It is understood by one of skill in the art that references made herein to metallocene catalyst compounds and/or systems may also refer to metallocene-type catalyst compounds and/or systems. As used herein, a catalyst system is a combination of a catalyst compound and a cocatalyst or activator. Typical metallocene compounds are generally described as containing one or more ligands capable of η-5 bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Exemplary of these metallocene catalyst compounds and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664. Also, the disclosures of European publications such as EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144 describe typical metallocene catalyst compounds and catalyst systems. Furthermore, metallocene catalyst compounds may contain one or more leaving group(s) bonded to the transition metal atom. For the purposes herein the term "leaving group" may refer to one or more chemical moieties, such as a ligand, bound to the center metal atom of a catalyst component that can be abstracted from the catalyst component by an activator or cocatalyst, thus producing a catalyst species active toward olefin polymerization or oligomerization.

The Cp ligands are generally represented by one or more bonding systems comprising n bonds that can be open systems or ring systems or fused system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Alternatively, the ring(s) or ring system(s) may be composed of carbon atoms such as, but not limited to, those cyclopentadienyl ligands or cyclopentadienyl-type ligand structures (structures isolobal to cyclopentadienyl). The metal atom may be selected from Groups 3 through 16 and the lanthanide or actinide series of the Periodic Table of Elements, and selected from Groups 4 through 12 in another embodiment, and selected from Groups 4, 5 and 6 in yet a more particular embodiment, and selected from Group 4 atoms in yet another embodiment.

Useful metallocene catalyst compounds include those represented by the formula:

$$L^A L^B MQ_n \quad (I)$$

wherein each $L^A$ and $L^B$ are bound to the metal atom (M), and each Q is bound to the metal center, n being 0 or an integer from 1 to 4, alternatively 1 or 2, and in another embodiment 2.

In formula (I), M is a metal from the Periodic Table of the Elements and may be a Group 3 to 12 atom or a metal from the lanthanide or actinide series Group atom in one embodiment; selected from the group consisting of Sc, Ti, Zr, Hf, V, Nb, Ta, Mn, Re, Fe, Ru, Os, Co, Rh, Ir, and Ni in another embodiment; and selected from the group consisting of Groups 4, 5 or 6 transition metal in yet another embodiment. In other illustrative embodiments, M is a transition metal from Group 4 such as Ti, Zr or Hf; selected from the group of Zr and Hf in another embodiment; and Zr in yet a more particular embodiment. The oxidation state of M may range from 0 to +7 in one embodiment; and in another embodiment, is +1, +2, +3, +4 or +5; and in yet another illustrative embodiment is +2, +3 or +4. The groups bound to M are such that the compounds described below in the formulas and structures are electrically neutral, unless otherwise indicated. The Cp ligand(s) form at least one chemical bond with the metal atom M to form a metallocene catalyst compound. The Cp ligands are distinct from the leaving groups bound to the catalyst compound in that they are not highly susceptible to substitution/abstraction reactions.

The $L^A$ and $L^B$ groups of formula (I) are Cp ligands, such as cycloalkadienyl ligands and hetrocylic analogues. The Cp ligands typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Also, $L^A$ and $L^B$ may be any other ligand structure capable of η-5 bonding to M and alternatively, $L^A$ and $L^B$ may comprise one or more heteroatoms, for example, nitrogen, silicon, boron, germanium, and phosphorous, in combination with carbon atoms to form a cyclic structure, for example, a heterocyclopentadienyl ancillary ligand. Furthermore, each of $L^A$ and $L^B$ may also be other types of ligands including but not limited to amides, phosphides, alkoxides, aryloxides, imides, carbolides, borollides, porphyrins, phthalocyanines, corrins and other polyazomacrocycles. Each $L^A$ and $L^B$ may be the same or different type of ligand that is -bonded to M. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further illustrative ligands may include cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), heterocyclic versions thereof and the like, including hydrogenated versions thereof.

Each $L^A$ and $L^B$ may be unsubstituted or substituted with a combination of substituent R groups. Non-limiting examples of substituent R groups include one or more from the group selected from hydrogen, or linear, branched, alkyl radicals or cyclic alkyl radicals, alkenyl, alkynl or aryl radicals or combination thereof, halogens and the like, including all their isomers, for example tertiary butyl, iso-propyl, etc. In illustrative embodiments, substituent R groups may comprise 1 to 30 carbon atoms or other substituents having up to 50 non-hydrogen atoms that can each be substituted with halogens or heteroatoms or the like. Alkyl or aryl substituent R groups may include, but are not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like. Halogenated hydrocarbyl radicals may include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen or Group 15-containing radicals including dimethylamine, dimethylphosphine, diphenylamine, methylphenylphosphine; and chalcogen or Group 16-containing radicals including methoxy, ethoxy, propoxy, phenoxy, methylsulfide, ethylsulfide and the like. Non-hydrogen substituent R groups may include the atoms carbon, silicon, boron, aluminum, nitrogen, phosphorous, oxygen, tin, germanium and the like including olefins such as but not limited to olefinically unsaturated substituents including vinyl-terminated ligands, for example, but-3-enyl, prop-2-enyl, hex-5-enyl, 2-vinyl, or 1-hexene. Also, at least two R groups, preferably two adjacent R groups may be joined to form a ring structure having from 3 to 30 atoms selected from carbon, nitrogen, oxygen, phosphorous, silicon, germanium, boron or a combination thereof. Also, an R group such as 1-butanyl may form a bond to the metal M.

The leaving groups Q of formula (I) are monoanionic labile ligands bound to M. Depending on the oxidation state of M, the value for n is 0, 1 or 2 such that formula (I) above represents a neutral metallocene catalyst compound, or a positively charged compound. In a class of embodiments, Q may comprise weak bases such as, but not limited to, alkyls, alkoxides, amines, alkylamines, phosphines, alkylphosphines, ethers, carboxylates, dienes, hydrocarbyl radicals having from 1 to 20 carbon atoms, $C_6$ to $C_{12}$ aryls, $C_7$ to $C_{20}$ alkylaryls, $C_7$ to $C_{20}$ arylalkyls, hydrides or halogen atoms (e.g., Cl, Br or I) and the like, and combinations thereof. Other examples of Q radicals include those substituents for R as described above and including cyclohexyl, heptyl, tolyl, trifluoromethyl, tetramethylene and pentamethylene, methylidene, methyoxy, ethyoxy, propoxy, phenoxy, bis(N-methylanilide), dimethylamide, dimethylphosphide radicals and the like.

Other useful metallocene catalyst compounds include those of formula (I) where $L^A$ and $L^B$ are bridged to each other by a bridging group, A. These bridged compounds are known as bridged, metallocene catalyst compounds represented by the formula (II):

$$L^A(A)L^BMQ_n \qquad (II)$$

wherein each $L^A$ and $L^B$ are bound to the metal center M, and each Q is bound to the metal center, n being 0 or an integer from 1 to 4, alternatively 1 or 2, and in another embodiment 2; the groups $L^A$, $L^B$ M and Q are as defined in formula (I); and the divalent bridging group A is bound to both $L^A$ and $L^B$ through at least one bond or divalent moiety, each.

Non-limiting examples of bridging group A from formula (II) include divalent bridging groups containing at least one Group 13 to 16 atom. In one possible embodiment, bridging group A may be referred to as a divalent moiety such as, but not limited to, carbon, oxygen, nitrogen, silicon, germanium and tin or a combination thereof. In other embodiment, bridging group A contains carbon, silicon or germanium atom and in yet another illustrative embodiment, A contains at least one silicon atom or at least one carbon atom. Other non-limiting examples of bridging groups A may be represented by $R'_2C=$, $R'_2Si=$, $-(R')_2Si(R')_2Si-$, $-(R')_2Si(R')_2C-$, $R'_2Ge=$, $-(R')_2Si(R')_2Ge-$, $-(R')_2Ge(R')_2C-$, $R'N=$, $R'P=$, $-(R')_2C(R')N-$, $-(R')_2C(R')P-$, $-(R')_2Si(R')N-$, $-(R')_2Si(R')P-$, $-(R')_2Ge(R')N-$, $-(R')_2Ge(R')P-$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atom, substituted Group 16 atom, or halogen; or two or more R' groups may be joined to form a ring or ring system; and independently, each Q can be a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof.

It is also contemplated that, the metallocene catalysts may include their structural or optical or enantiomeric isomers (meso and racemic isomers) and mixtures thereof. In some embodiments, the metallocene compounds may be chiral and/or a bridged metallocene catalyst compound. Further, as used herein, a single, bridged, asymmetrically substituted metallocene catalyst component having a racemic and/or meso isomer does not, itself, constitute at least two different bridged, metallocene catalyst components.

Group 15 Atom and Metal Containing Catalysts

In some embodiments, "Group 15 atom and metal containing catalysts," or the short-hand "Group 15-containing" catalyst, may be used either alone or for use with a metallocene or other olefin polymerization catalyst. Generally, Group 15-containing catalyst components may include complexes of Group 3 to 12 metal atoms, wherein the metal atom is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. No. 5,318,935, U.S. Pat. No. 5,889,128, U.S. Pat. No. 6,333,389 B2 and U.S. Pat. No. 6,271,325 B1.

In some embodiments, the Group 15-containing catalyst components may include Group 4 imino-phenol complexes, Group 4 bis(amide) complexes, and Group 4 pyridyl-amide complexes that are active towards olefin polymerization to any extent. In one possible embodiment, the Group 15-containing catalyst component may include a bisamide compound such as $[(2,3,4,5,6\ Me_5C_6)NCH_2CH_2]_2NHZrBz_2$.

Mixed Catalysts

In some embodiments, one or more of the catalyst compounds described above may be combined with one or more of the catalyst compounds described herein with one or more activators or activation methods described below including optional additives, scavengers, continuity aids, supports, etc.

In an embodiment, one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090.

Activators and Activation Methods

An activator (also known as cocatalyst) is defined as any combination of reagents that increases the rate at which a transition metal compound oligomerizes or polymerizes unsaturated monomers, such as olefins. The transition metal compounds may be activated for oligomerization and/or polymerization catalysis in any manner sufficient to allow coordination or cationic oligomerization and or polymerization.

Combinations of activators are also contemplated, for example, alumoxanes and ionizing activators in combination may be used, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate). 4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

In one embodiment, alumoxanes activators may be utilized as an activator in the catalyst composition. Alumoxanes are generally oligomeric compounds containing $—Al(R)—O—$ subunits, where R is an alkyl group. Examples of alumoxanes include methylalumoxane (MAO), modified methylalumoxane (MMAO), ethylalumoxane and isobutylalumoxane.

Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

In some embodiments, an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, WO 98/43983), boric acid (see, U.S. Pat. No. 5,942,459) or a combination thereof, may be used. Neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In other embodiments, the three groups are halogenated, preferably fluorinated, aryl groups. In some embodiments, the neutral stoichiometric activator is selected from trisperfluorophenyl boron or trisperfluoronapthyl boron.

Exemplary ionic stoichiometric activator compounds are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198, 401, 5,066,741, 5,206,197, 5,241,025, 5,384,299 and 5,502, 124.

Supports and Methods of Supporting

The catalyst compositions or systems may include a support material (or carrier). For example, the one or more catalyst and/or one or more activators may be deposited on, contacted with, vaporized with, bonded to, or incorporated within, adsorbed or absorbed in, or on, one or more supports or carriers.

The supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034, 187) and the like. Also, combinations of these support materials may be used, for example, silica-chromium, silica-alumina, silica-titania and the like. Additional support materials may include those porous acrylic polymers described in EP 0 767 184 B1. Other support materials include nanocomposites as disclosed in WO 99/47598, aerogels as disclosed in WO 99/48605, spherulites as disclosed in U.S. Pat. No. 5,972,510 and polymeric beads as disclosed in WO 99/50311.

The support material, such as an inorganic oxide, may have a surface area in the range of from about 10 to about 700 $m^2/g$, pore volume in the range of from about 0.1 to about 4.0 cc/g and average particle size in the range of from about 0.1 to about 500 μm. More preferably, the surface area of the support material is in the range of from about 50 to about 500 $m^2/g$, pore volume of from about 0.5 to about 3.5 cc/g and average particle size of from about 1 to about 60 μm. Most preferably the surface area of the support material is in the range is from about 100 to about 400 $m^2/g$, pore volume from about 0.8 to about 3.0 cc/g and average particle size is from about 1 to about 50 μm. The average pore size of the carrier typically has pore size in the range of from 10 to 1000 Å, alternatively 50 to about 500 Å, and in some embodiment 75 to about 350 Å.

The above described metallocene catalyst compounds and catalyst systems as well as conventional-type transition metal catalyst compounds and catalyst systems may be combined with one or more support materials or carriers using one of the support methods well known in the art or as described below. In one possible embodiment, the method uses a catalyst, such as a metallocene or a conventional-type transition metal catalyst, in a supported form.

In one embodiment, the metallocene catalyst compounds may be supported on the same or separate supports together with an activator, or the activator may be used in an unsupported form, or may be deposited on a support different from the supported metallocene catalyst compound, or any combination thereof. This may be accomplished by any technique commonly used in the art.

In one embodiment, a supported catalyst system that may use any antistatic agents or surface modifiers that are typically used in the preparation of the supported catalyst systems may be used. As used herein, "surface modifiers" may include compounds such as, but not limited to, ethoxylated amines (e.g., IRGASTAT AS-990 from Ciba), mercaptans (e.g., octylmercaptan), surfactants, sulfonates, Group 1 or 2 cations, and other organic and inorganic additives that are added to the catalyst composition (metallocene, activator and support material) or directly to the reactor to improve reactor performance by, for example, reducing fouling or sheeting of polymer on the inner surfaces of the reactor, or by reducing the formation of large chunks (greater than 1 or 2 cm diameter/length) of polymer from forming. The surface modifier excludes activator compounds, and in fact, surface modifiers may inhibit catalyst activity.

One method for producing the supported catalyst system is described as follows: a metallocene catalyst is slurried in a liquid to form a metallocene solution and a separate solution is formed containing an activator and a liquid. The liquid may be any compatible solvent or other liquid capable of forming a solution or the like with the metallocene catalyst and/or activator. In one embodiment the liquid is a cyclic aliphatic or aromatic hydrocarbon. The metallocene catalyst and activator solutions are mixed together and added to a porous support or the porous support is added to the solutions such that the total volume of the metallocene catalyst solution and the activator solution or the metallocene catalyst and activator solution is less than four times the pore volume of the porous support, more preferably less than three times, even more preferably less than two times; ranges being from 1.1 times to 3.5 times range and most preferably in the 1.2 to 3 times range.

In a class of embodiments, olefins) or alpha-olefin(s), such as ethylene, propylene or combinations thereof, including other comonomers, are prepolymerized in the presence of the catalyst system prior to the main polymerization. The prepolymerization can be carried out batchwise or continuously in gas, solution, or slurry phase including at elevated pressures. The prepolymerization can take place with any olefin monomer or combination and/or in the presence of any molecular weight controlling agent. For examples of prepolymerization procedures, see U.S. Pat. Nos. 4,748,221, 4,789,359, 4,923,833, 4,921,825, 5,283,278 and 5,705,578, EP-B-0279 863 and WO 97/44371. A prepolymerized catalyst system for purposes herein is a supported catalyst system.

Organometallic Compound

The at least one organometallic compound may be represented by the formula:

$$M_a R$$

wherein M is an atom from Group 1, 2, 12, and 13 from the Periodic Table and mixtures thereof and wherein a is the valence state of M. M may be, for example, Mg, Zn, Li, Al, Na, K, and mixtures thereof; preferably Mg, Zn, Al, and mixtures thereof. R may be the same or independently different and may be selected from radicals selected from the group consisting of halogens, alkyls, aryls, alkylaryls, arylalkyls, alkoxys and alkenyls, cyclopentadienyl with from 0 to 5 substituents, wherein the substituents may form rings (such as indenyl rings) compounds and mixtures thereof; and wherein at least one R is an alkyl, alkyaryl, arylalkyl or cyclopentadienyl. The number of R is sufficient to balance the valence state of M.

In particular, for example, R may be selected from $C_{1-20}$ alkenyls (preferably, ethenyl, propylenyl, butenyl, and pentenyl); $C_{1-20}$ alkyl group (preferably, methyl, ethyl, n-propyl, iso-propyl, n-butyl, n-octyl, and 2-ethylhexyl groups); $C_{1-C20}$ alkoxys (preferably, ethoxy, propoxy, butoxy); $C_{6-20}$ aryl groups, alkylaryl groups, (preferably, phenyl, ptolyl, benzyl, 4-t-butylphenyl, 2,6 dimethylphenyl, 3,5 methylphenyl, 2,4-dimethylphenyl, 2,3-dimethylphenyl groups); $C_{5-25}$ cyclopentadienyls (preferably, mono and bis cyclopentadienyl) and mixtures of two or more of the foregoing.

The at least one organometallic compound may include dialkylmagnesium compounds, such as dialkylmagnesium, alkylmagnesium alkoxide, alkylmagnesium halide, and dialkylzinc, trialkylaluminum and mixtures thereof. In particular, examples include diethyl zinc, dibutylmagnesium, trimethylaluminum, triethylaluminum, butylethylmagnesium, dibutylmagnesium, butylmagnesium butoxide, butylethylmagnesium butoxide, ethylmagnesium chloride, and mixtures thereof.

The at least one organometallic compound may comprise triisobutylaluminium, tripropylaluminium, tributylaluminium, dimethylchloroaluminium, dimethylisobutylaluminium, dimethylethylaluminium, diethylchloroaluminium, triisopropylaluminium, tri-s-butylaluminium, tricyclopentylaluminium, tripentylaluminium, triisopentylaluminium, trihexylaluminium, ethyldimethylaluminium, methyldiethylaluminium, triphenylaluminium, tri-p-tolylaluminium, dimethylaluminiummethoxide, dimethylaluminiumethoxide, methyllithium, butyllithium, di-n-propylzinc, di-n-butylzinc, trimethylboron, triethylboron, triisobutylboron, tripropylboron, tributylboron, or mixtures thereof.

The at least one organometallic compound may comprise (in the alternative, consists essentially of) diethyl zinc, trimethylaluminum, triethylaluminum, or (and) mixtures thereof.

In some embodiments, the preferred organometallic compound is diethyl zinc (DEZ). DEZ amount may vary depending on the residual moisture level in the seed bed.

The level of the at least one organometallic compound, such as, for example, DEZ, may range from 1 to 500 ppmw based upon the total weight of the weight of the seed bed, or from 10 to 300 ppmw, or from 25 to 250 ppmw, or from 50 to 250 ppmw, or from 75 to 250 ppmw, or from 90 to 225 ppmw, or from 100 to 200 ppmw, based upon the total weight of the weight of the seed bed.

The seed bed additionally may be treated with a hydrocarbon, for example, at least one alkane such as isopentane. The level of the hydrocarbon, for example, isopentane, may range from 1 to 25 mole percent in the gaseous phase, alternatively, from 1 to 10 mole percent in the gaseous phase, alternatively, from 2 to 8 mole percent in the gaseous phase, and, alternatively, from 2.5 to 5.0 mole percent in the gaseous phase, during treatment and/or in preparation of the seed bed. In other embodiments, the hydrocarbon, such as isopentane, may be present in about 3 mole percent, during treatment and/or in preparation of the seed bed.

The seed bed additionally may be treated with at least one continuity additive. The level of the at least one continuity additive may range from 1 to 100 ppmw based upon the total weight of the seed bed, or 5 to 60 ppmw, or 10 to 50 ppmw, or 20 to 40 ppmw, or 25 to 40 ppmw, based upon the total weight of the seed bed. In other embodiments, the at least one continuity additive may be present in about 30 ppmw based upon the total weight of the seed bed. In some embodiments, the continuity additive comprises a carboxylate metal salt, an amine blend composition, or a mixture thereof. Preferably the carboxylate metal salt is a metal stearate and may be selected from aluminum stearate and aluminum distearate. Other useful continuity additives are described below.

The seed bed may have a water concentration of 7 ppmw or greater, or 10 ppmv or greater, or 15 ppmv or greater in the polymerization reactor gaseous phase. In some embodiments, the seed bed may have a water concentration in the range of 7 to 50 ppmv, or in the range of 10 to 40 ppmv, or in the range of 15 to 30 ppmv.

The molar ratio of the organometallic compound to water in the seed bed may be from 100:1, or from 50:5. In some embodiments, the molar ratio of the organometallic compound to water is from 1:3, or from 1:2, or from 1:1. In preferred embodiments, the organometallic compound is diethyl zinc and the molar ratio of the diethyl zinc to water in the seed bed is from 100:1, or from 50:1, or from 1:3, or from 1:2, or from 1:1.

Polyolefin catalysts may benefit and demonstrate increased productivity utilizing embodiments of the seed bed described herein. The benefit is of particular advantage in the start-up and early stages of establishing a polymerization reaction in a gas phase fluidized bed. It is also particularly important with metallocene catalysts that the reaction initiates within minutes of being injected into the reaction system since there is generally no external addition of a scavenger such as an aluminum alkyl. This results in the catalyst also acting as a scavenger in some embodiments. These deactivated catalyst particles circulate and lead to increased carry-over and collect in dead spots in the external cycle gas loop. They may later reactivate and lead to fouling of the distributor plate. It has been found that this fouling is peculiar to several classes of metallocene catalysts and not generally an issue with Ziegler-Natta or chromium based systems. This may also contribute to fouling of the reactor vessel freeboard above the fluid bed including the expanded cone and dome sections of the polymerization vessel leading to dome and expanded section sheeting. It has been found that the static measured in the external cycle gas loop increases substantially and is strongly correlated with this fouling. This static is generally referred to as entrainment static. In addition, other operability upsets in a gas phase fluidized bed polymerization process may occur and include increased electrostatic activity in the fluidized bed and other points in the polymerization vessel, increased entrainment static, reactor wall skin temperature depression or excursion relative to the fluidized bed temperature respectively indicative of accumulation of resin at the reactor wall resulting in an insulating effect or the formation of fused resin agglomerates, reactor sheeting, and a transient substantial decrease in the fluidized bulk density of the polymer particulate bed that may last from a few hours to as long as a day or longer. The change in fluidized bulk density may necessitate adjustment to the weight or amount of particulate polymer in the bed in order to maintain the height of the fluidized bed (bed level) in the normal operational range during this stage. If not adjusted, the bed level can exceed the normal operational range by several feet, which can lead to entrainment and carry-over of the polymer particulate resin with the circulating gas in a fluidized bed polymerization system. As noted above, this increased carryover may contribute to fouling of the pipe network that removes gas from the top of the vessel and returns it to the lower portion of the vessel after passing through a blower and tubular heat exchanger to cool the gas. These pieces of equipment as well as the reactor bottom head and the fluidized bed distributor plate may possibly experience fouling due to the increased carryover.

Without being bound to theory, it is believed that these instabilities are attributed to at least in part to residual impurities in the seed bed and the reactor, e.g. residual moisture and/or adsorbed oxygen. It has been observed that the initial catalyst fed to the reactor tends to interact with these impurities and results in delayed initiation of the polymerization reaction initiation and the generation of static electricity in the bed. The delay in the initiation of polymerization after the catalyst feed to the polymerization reactor is started may last for a few minutes to up to an hour or more. When reaction does begin, it can appear to be sluggish and slow to reach normal rates. This can continue for several hours and possibly a day or two depending on the concentration and type of impurity present in the polymerization system and seed bed.

In several classes of preferred embodiments, the method provides for the treatment of the seed bed with at least one organometallic compound such as, for example, diethyl zinc, prior to initiation of catalysis, for example, metallocene catalysis. In several embodiments, this provided for at least one of the following: fast initiation of the reaction, elimination of fluidized bulk density depression during start-up, scavenging residual impurities especially low level of moisture that may poison the active species of the catalyst, reducing entrainment and the reactor bed static, mitigating reactor wall skin temperature depression and excursion, and preventing reactor sheeting and fouling.

In some embodiments, the method provided herein provides a polymerization reaction that is initiated within 25 minutes or less, or within 15 minutes or less, or within 5 minutes or less, of the contacting of the seed bed, the catalyst system, and the one or more olefins.

In some embodiments, the method provided herein provides a polymerization reaction in which substantially no static activity occurs in the reactor. By "substantially no static activity" it is meant that the bed electrostatic activity is less than +/−50 volts. In some embodiments, the method provided herein provides a polymerization reaction in which no static activity occurs in the reactor. By "no static activity" it is meant that the bed electrostatic activity is less than +/−25 volts.

Hydrocarbon

In several classes of embodiments, the seed bed and/or reactor system may comprise at least one hydrocarbon. Exemplary methods and materials for using hydrocarbons in this regard may be found, for example, in U.S. Pat. No. 6,114,475.

The at least one hydrocarbon is generally an organic compound predominantly comprising the elements carbon and hydrogen. The at least one hydrocarbon may be saturated or unsaturated, and optionally substituted. In some embodiments, the at least one hydrocarbon may be selected from aliphatic hydrocarbons such as alkanes, alkenes, acetylenes, and acyclic terpenes. In other embodiments, the at least one hydrocarbon may be selected from cyclic hydrocarbons such as alicyclic hydrocarbons, such as cycloalkanes, cycloalkenes, and cycloacetylenes; as well as aromatic hydrocarbons including one or more rings structures. In yet other embodiments, the at least one hydrocarbon may be selected from alkyl halides, silylated hydrocarbons, ethers, polyethers, thioethers, esters, thioesters, lactones, amides, amines, polyamines, nitrites, silicone oils, other aprotic solvents. In any of the above embodiments, where applicable, the at least one hydrocarbon may be branched or linear, or comprise block sequences characteristic of both. In any of the above embodiments, the at least one hydrocarbon may comprise two or more of the aforementioned hydrocarbons.

In some embodiments, the at least one hydrocarbon may be selected from $C_4$ to $C_{22}$ linear, cyclic, or branched alkanes, alkenes, aromatics, and mixtures thereof. Examples include propane, isobutane, pentane, isopentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, c is 1,2-dimethylcyclopentane, trans-i,2-dimethylcyclopentane, trans-i,3-dimethylcyclopentane, ethylcyclopentane, cyclohexane, methylcyclohexane, benzene, toluene, xylene, ortho-xylene, para-xylene, meta-xylene, and mixtures thereof. In preferred embodiments, the hydrocarbon is isopentane.

Halogenated versions of the above may also be used. For example, chlorinated hydrocarbons, such as, methyl chloride, methylene chloride, ethyl chloride, propyl chloride, butyl chloride, chloroform, and mixtures thereof, may be used. Additionally, hydrofluorocarbons may also be used.

In some embodiments, the at least one hydrocarbon may be selected from nitrated alkanes, including $C_2$ to $C_{22}$ linear, cyclic, or branched, nitrated alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclornethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

In some embodiments, the at least one hydrocarbon may be selected from $C_1$ to $C_{22}$ alcohols, ketones, ethers, carboxylic acids, esters, and mixtures thereof.

Continuity Additive and Other Additives

At least one continuity additive ("CA") may be introduced into the seed bed. In certain embodiments, the CA is loaded into a reactor and can have any composition provided that it will improve continuity or operability of the process.

Examples of CAs suitable for improving continuity of a variety of polymerization reactions are described in U.S. Pat. Nos. 6,482,903, 6,660,815, 6,306,984, and 6,300,436. Typically, a CA is not catalytic but is combined with a catalyst (and optionally also with a flow improver) before or after being introduced into the reactor.

The CA may comprise at least one of aluminum stearate, other metal stearates, ATMER AS 990 (an ethoxylated stearyl amine, available from Ciba Specialty Chemicals Co, Basel, Switzerland), and carboxylate metal salts.

Carboxylate metal salts that may be suitable as continuity additives (CAs) include any mono- or di- or tri-carboxylic acid salt with a metal portion from the Periodic Table of Elements. Examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

Another carboxylate metal salt that may be suitable for use as a CA is an aluminum carboxylate. For example, it can be one of the aluminum mono, di- and tri-stearates, aluminum octoates, oleates and cyclohexylbutyrates. For example, the carboxylate metal salt can be $(CH_3(CH_2)_{16}COO)_3Al$, an aluminum tri-stearate (preferred melting point 115° C.), $(CH_3(CH_2)_{16}COO)_2$-A—OH, an aluminum di-stearate (preferred melting point 145° C.), or $CH_3(CH_2)_{16}COO-Al-(OH)_2$, an aluminum mono-stearate (preferred melting point 155° C.).

For some applications, a carboxylate metal salt employed as a CA has a melting point from about 30° C. to about 250° C. (preferably from about 100° C. to about 200° C.). For some applications, the carboxylate metal salt employed as a CA is an aluminum stearate having a melting point in the range of from about 135° C. to about 65° C. For typical applications, the carboxylate metal salt employed as a CA has a melting point greater than the polymerization temperature in the reactor.

Other examples of carboxylate metal salts that may be suitable for use as continuity additives include titanium stearates, tin stearates, calcium stearates, zinc stearates, boron stearate and strontium stearates.

The at least one CA, such as a carboxylate metal salt, may be combined (for use as a continuity additive to be loaded into a reactor) with an antistatic agent such as a fatty amine, for example, Atmer AS 990/2 zinc additive, a blend of ethoxylated stearyl amine and zinc stearate, or Atmer AS 990/3, a blend of ethoxylated stearyl amine, zinc stearate and octadecyl-3,5-di-tert-butyl-4-hydroxyhydrocinnamate. Both the AS 990/2 and 990/3 blends are available from Crompton Corporation of Memphis, Tenn.

The at least one CA, such as a carboxylate metal salt, may be combined (for use as a continuity additive to be loaded into a reactor) with at least one flow improver, that can be combined with a CA (e.g., a carboxylate metal salt) in dry form and then loaded in a reactor for improving continuity of a subsequent olefin polymerization process in the presence of a catalyst composition including a catalyst system (e.g., a supported metallocene-type catalyst system), is a colloidal particulate material (e.g., SNOWTEX colloidal silica, available from Nissan Chemical Industries, Tokyo, Japan, or Aerosil colloidal silica, available from Degussa, or another colloidal silica). Other examples of a flow improver for use are a colloidal silica (e.g., Cabosil, available from Cabot), a fumed silica, a syloid, and alumina.

Another example of a substance that can be employed as a CA is an antistatic agent of any of the types described in U.S. Pat. No. 6,245,868, issued Jun. 12, 2001. As described in U.S. Pat. No. 6,245,868, an antistatic agent is any organic compound containing at least one electron rich heteroatom from Groups IV, V and/or VI and a hydrocarbyl moiety. Non-limiting examples of typical heteroatoms include silicon, oxygen, nitrogen, phosphorus, and sulfur. The antistatic agent should also contain at least one active hydrogen atom attached to the heteroatom. In some embodiments, it is preferable that the hydrocarbyl moiety have a molecular weight sufficient to give it solubility in typical hydrocarbon solvents, such as, for example a cyclic aliphatic or aromatic hydrocarbon, for example toluene.

In some embodiments, the CA comprises a carboxylate metal salt, an amine blend composition, or a mixture thereof. Preferably the carboxylate metal salt is a metal stearate and may be selected from aluminum stearate and aluminum distearate.

When a CA has been loaded in a reactor, one or more sensors (e.g., acoustic carryover probes or entrainment static probes) can be used to monitor the presence of the CA in the reactor's cycle gas loop. In response to the output of such a sensor, the operator can determine whether more CA should be loaded into the reactor.

In some embodiments, a CA is loaded into a reactor to cause the CA to be present in the reactor in a concentration (relative to the weight of a seed bed also present in the reactor) in one of the following ranges: 2 ppm by weight to 3% by weight, or preferably 5 ppm to 1000 ppm, or more preferably 5 ppm to 200 ppm, or more preferably 10 ppm to 100 ppm, or most preferably 15 ppm to 50 ppm by weight.

In a class of embodiments, during a polymerization reaction, static voltage levels can rise approaching the levels which induce sheeting. Static voltage in the reactor is monitored near the reactor wall by one or more static voltage indicators such as static probe inserted into the reactor bed. The static probe can comprise an electrostatic voltmeter or picoammeter to measure voltage or current respectively on a ½-inch spherical electrode located in the fluid bed, 1 inch radially from the reactor wall and usually 5 to 6 feet above the gas distributor plate on large industrial-scale polymerization systems. The location may be selected because sheet formation has been observed to initiate in a band ranging from ¼ to ¾ reactor diameter in elevation above the base (i.e., the distributor plate) of the fluid bed. For deep fluidized beds, this corresponds to the region of least mixing intensity near the wall, i.e., a null zone, where particle motion near the wall changes from generally upward to generally downward (i.e., the location of static-induced sheeting). Static at this location is generally believed to be a good indicator of the state of the reactor. Static voltage can also be measured at other locations and can employ other devices known in the art such as current probes.

During a sheeting episode, in several embodiments, the static rises as indicated by the static probe followed by one or more skin thermocouples indicating a local temperature above the bed temperature. This means that there is a sheet growing on the thermocouple. The voltage range of the indicators is in the range of about 15,000 volts. With polymerization reaction in progress, changes in static voltage levels from neutral to either positive or negative polarity may lead to agglomerate formation which may incur a process upset or even shutdown. In the case of the picoammeter, the range is from 10-100 nanoamps.

Skin thermocouples may be installed with their tip just inside the reactor walls (¼ inch insertion) at selected elevations above the distributor plate and within the fluidized bed. Under conventional operations, skin thermocouples may indicate temperatures equal to or slightly lower than the temperature of the fluidized bed. When sheeting occurs, these thermocouples may indicate temperature excursions of from 1 to 30° C. above the temperature of the fluidized bed, thus, providing reliable indication of the occurrence of sheeting. In some embodiments, the polymerization reactors occurs in at least one reactor having wall skin thermocouples which indicates a temperature excursion of less than 30° C. above the temperature of the fluidized bed, or less than 10° C., or less than 5° C. In some embodiments, the wall skin thermocouple indicates that substantially no temperature excursion has occurred. By "substantially no temperature excursion" it is meant that the skin thermocouples indicate that the wall temperature is within ±2° C. of the temperature of the fluidized bed. In some embodiments, the wall skin thermocouple indicates that no temperature excursion has occurred. By "no temperature excursion" it is meant that the skin thermocouples indicate that the wall temperature is within ±0.5° C. of the temperature of the fluidized bed.

Reactor Systems and Polymerization Processes

An exemplary reactor system and polymerization process that may be implemented, will be further described with reference to FIG. 1. The system in FIG. 1 includes a fluidized bed reactor 1. Reactor 1 has a bottom end 7, a top section 10, a cylindrical (straight) section 2 between bottom end 7 and top section 10, and a distributor plate 3. The diameter of each horizontal cross-section of section 10 is greater than the diameter of straight section 2. In operation, dense-phase surface 11 is the boundary between lean phase material present within reactor 1 (above dense-phase surface 11) and dense-phase material 12 within reactor 1 (in the volume bounded by section 2, plate 3, and surface 11). In operation, freeboard surface 10 of reactor 1 includes the inner surface of top section 13 and the portion of the inner surface of section 2 above surface 11.

The FIG. 1 system also has a cooling control loop which includes circulating gas cooler 6 and compressor 5, coupled with reactor 1 as shown. During operation, the cooled circulating gas flows from cooler 6 through inlet 14, then propagates upward through the bed and out from reactor 1 via outlet 15. The cooling fluid (whose temperature has increased during its flow through reactor 1) is pumped by compressor 5 from outlet 15 back to cooler 6. Temperature sensors (not shown) near the inlet and outlet of cooler 6 typically provide feedback to cooler 1 and/or compressor 5 to control the amount by which cooler 6 reduces the temperature of the fluid entering its inlet and/or flow rate through compressor 5.

Conventionally, a seed bed is pre-loaded into or is present from a previous polymerization reaction in reactor 1 before the start of a polymerization reaction therein. The seed bed may consist essentially of granular material. At the start of the polymerization reaction, dense-phase material 16 includes the seed bed.

In some embodiments, at least one organometallic compound and a seed bed are pre-loaded into or are previously present in a reactor (e.g., reactor 1) in which a polymerization reaction can be performed. Optionally, a polymerization reaction is then performed in the reactor. Optionally, in other embodiments, at least one hydrocarbon may also be pre-loaded into or be previously present in a reactor (e.g., reactor 1) in which a polymerization reaction can be performed. Optionally, a polymerization reaction is then performed in the reactor. In yet other embodiments, CA and/or a flow improver may also be pre-loaded into or previously present in a reactor (e.g., reactor 1) in which a polymerization reaction can be performed. Optionally, a polymerization reaction is then performed in the reactor. In any of the above, the materials to be pre-loaded may be collectively referred to as 17 and be introduced into the reactor via support tubes 16 extending through the wall of the reactor 1, with the outlet end of each support tube at least partially, if not completely, extended into the seed bed. As used herein, the phrase "support tube" denotes a tube (typically a heavy walled tube) extending, for example, from about 0.1 $R_R$ to 0.6 $R_R$ into a reactor through which another tube optionally be placed, where $R_R$ is the radius of the reactor. The materials 17 may be introduced into the reactor either through a support tube or another tube or other means optionally positioned.

Utilizing a seed bed in accordance with the any of the above embodiments may significantly improve the continuity of a polymerization reaction process subsequently performed in the reactor during the reaction's initial stage or stages (before the reaction has stabilized), including, for example, by reducing sheeting and fouling. In some embodiments, loading is accomplished by loading the seed bed into reactor 10 and then introducing the at least one organometallic compound, optionally, with the at least one hydrocarbon, and optionally, with at least one CA (or a combination of at least one CA and at least one flow improver) before the start of a polymerization reaction.

In some embodiments, a seed bed of polyolefin resin may be conveyed to the reactor from a storage facility such as a bin or a hopper car. The seed bed is then heated to a given temperature and purged with an inert gas such as nitrogen to remove oxygen and some residual moisture. The seed bed in the reactor is then brought up to desired reaction conditions by introducing monomers and comonomers and hydrogen. A desired catalyst system, such as, for example, a catalyst system including a metallocene catalyst, is then introduced to the reactor to initiate polymerization. The seed bed may be treated with some level of an additive, for example, a continuity additive (CA) prior and/or during the increased concentration of monomers and optional comonomers.

The seed bed is either pre-loaded or present in the reactor. And again as in the conventional method mentioned above, the seed bed is heated to a given temperature and is purged with an inert gas such as nitrogen to remove oxygen and some residual moisture. However, unlike in the conventional method, an organometallic compound is injected into the seed bed and circulated for a given period prior to introducing monomers and comonomers. Additionally, the seed bed may be treated by feeding an inert hydrocarbon such as isopentane and also, the seed bed may be additionally treated with some level of a continuity additive. The organometallic compound can be fed to the seed bed through a injection tube directly inserted into the reactor vessel or into the cycle line. The organometallic compound can be also diluted with an inert hydrocarbon prior to injection. Following the treatment of the seed bed with the organometallic compound and optionally with an inert hydrocarbon and/or a continuity additive, monomers and comonomers are introduced to the reactor to the desired concentrations. Metallocene catalyst feed is then initiated to the reactor and polymerization is commenced.

Implementing Seed Bed Operation and the Polymerization Process

Reactor 1 may be implemented as a mLLDPE (metallocene-catalyzed, linear low-density polyethylene) reactor or mHDPE (metallocene-catalyzed, high-density polyethylene) reactor.

We next describe examples of commercial-scale reactions (e.g., commercial-scale, gas-phase fluidized-bed polymerization reactions) that can be performed in a reactor that has been loaded. In different embodiments, any of a variety of different reactors is loaded and optionally also then operated to perform a polymerization reaction.

In some embodiments, a continuous gas phase fluidized bed reactor is loaded before it operates to perform polymerization as follows. The fluidized bed is made up of polymer granules. Liquid or gaseous feed streams of the primary monomer and hydrogen together with liquid or gaseous comonomer are combined and introduced into the recycle gas line upstream of the fluidized bed. For example, the primary monomer is ethylene and the comonomer is hexene. The individual flow rates of ethylene, hydrogen and comonomer are controlled to maintain fixed composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio. The concentration of all gases is measured by an on-line gas chromatograph to ensure relatively constant composition in the recycle gas stream. A solid or liquid catalyst is injected directly into the fluidized bed using purified nitrogen as a carrier or an inert hydrocarbon. Its rate is adjusted to maintain a constant production rate. The reacting bed of growing polymer particles is maintained in a fluidized state by the continuous flow of the make up feed and recycle gas through the reaction zone. In some implementations, a superficial gas velocity of 1-3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is loaded and then operated to perform polymerization using any of a variety of different processes (e.g., solution, slurry, or gas phase processes). For example, the reactor can be a fluidized bed reactor that is operated to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction is performed in a reactor that has been loaded. The reaction can be a continuous gas phase process (e.g., a fluid bed process). A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode." A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. The gas is compressed in a compressor, passed through a heat exchanger wherein the heat of polymerization is removed, and then returned to the reaction zone.

The reactor temperature of the fluid bed process can range from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. The polymerization temperature or reaction temperature typically must be below the melting or "sintering" temperature of the polymer to be formed. Thus, the upper temperature limit in one embodiment is the melting temperature of the polyolefin produced in the reactor.

In other embodiments, a reactor that has been loaded is then operated to effect polymerization by a slurry polymerization process. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reactor that has been loaded is operated to perform particle form polymerization, or a slurry process in which the temperature is kept below the temperature at which the polymer goes into solution. In other embodiments, a reactor that has been loaded is a loop reactor or one of a plurality of stirred reactors in series, parallel, or combinations thereof. Non-limiting examples of slurry processes include continuous loop or stirred tank processes.

A reactor that has been loaded can be operated to produce homopolymers of olefins, e.g., ethylene, and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reactor that has been loaded can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, up to 50 atmospheres in yet another embodiment, and up to 30 atmospheres in yet another embodiment.

Hydrogen gas is often used in olefin polymerization to control the final properties of the polyolefin. For some types of catalyst systems, it is known that increasing concentrations (partial pressures) of hydrogen increase the melt flow (MF) and/or melt index (MI) of the polyolefin generated. The MF or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in some polymerization processes is an amount necessary to achieve the desired MF or MI of the final polyolefin resin. In one embodiment, the mole ratio of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor that is loadable, in, some embodiments, is an element of a staged reactor employing two or more reactors in series, wherein one reactor may produce, for example, a high molecular weight component and another reactor may produce a low molecular weight component.

A reactor that has been loaded can be operated to implement a slurry or gas phase process in the presence of a metallocene or metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components.

A reactor that has been loaded can be operated to perform a reaction that employs one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution or a slurry with or without the catalyst system or its components.

In a reactor that has been loaded, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Atmer AS-990 (Ciba Specialty Chemicals, Basel, Switzerland). Other antistatic compositions include the Octastat family of compounds, more specifically Octastat 2000, 3000, and 5000.

Metal fatty acids and antistatic agents can be added as either solid slurries or solutions as separate feeds into the reactor. One advantage of this method of addition is that it permits on-line adjustment of the level of the additive.

Examples of polymers that can be produced include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more $C_2$-$C_{18}$ alpha olefin; terpolymers of one or more C2-C18 alpha olefins with a diene.

Monomers that can be present in a reactor include one or more of: $C_2$-$C_{18}$ alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization (e.g., mechanically stirred and/or gas fluidized) reactions can be performed in some reactors that have been loaded. Such a reaction can be any type of fluidized polymerization reaction and can be carried out in a single reactor or multiple reactors such as two or more reactors in series.

In various embodiments, any of many different types of polymerization catalysts can be used in a polymerization process performed in a reactor that has been loaded. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction performed in a reactor that has been loaded can employ other additives.

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Polymerization Processes

All the tests in the following examples were carried out in gas-phase UNIPOL™ PE Reactors utilizing XCAT™ HP-100 and EZ-100 Metallocene Catalysts, all available from Univation Technologies, LLC, Houston, Tex.

Example 1

Comparative

The pilot plant reactor was exposed to air and moisture by removing a manway above the distribution plate. Following reassembling of the reactor, the empty reactor was heated up to about 90° C. with nitrogen and purged to remove excessive moisture. The reactor was then vented down and a seed bed of approximately 50-55 kg was charged to the reactor by transferring granular resin made previously from a charging vessel to the reactor. Following charging of the seed bed to the reactor, high pressure nitrogen was introduced and the seed bed was fluidized. The bed temperature was raised to approximately 90° C. and the seed bed was flow purged with N2 at this temperature until the moisture level as measured by a SHAW portable moisture analyzer was about 10 ppmv (in the vapor phase). The following reaction conditions were then established prior to catalyst feed: reactor temperature of 85° C., hexene to ethylene molar ratio of 0.020, hydrogen ppmv of about 400 and ethylene partial pressure of 220 psi. XCAT™ HP 100 catalyst feed was initiated to the reactor. The reaction came on sluggishly after initiating catalyst feed for approximately 1.5 hours. Also, the fluidized bulk density dropped by 5 lb/cf before recovering approximately 12 hours after establishing reaction.

Example 2

Comparative

As in example 1 above, the reactor was exposed to air and moisture and purged with nitrogen prior to charging the seed bed. A seed bed of approximately 65 kg made with XCAT™ HP 100 catalyst was charged to the reactor and dried until the moisture level dropped to approximately 4.8 ppmv. The following reaction conditions were then established prior to catalyst feed: reactor temperature of 79° C., hexene to ethylene molar ratio of 0.015, hydrogen ppmv of about 280 and ethylene partial pressure of 220 psi. XCAT™ HP 100 catalyst feed was initiated to the reactor. The reaction came on sluggishly approximately 6 hours after initiating catalyst feed. Also, the reactor wall skin thermocouples showed temperature excursion of approximately 10° C. above bed temperature indicating resin sintering and sheeting. Also, the fluidized bulk density dropped by 5 lb/cf before recovering approximately 10 hours after establishing reaction. Also, heavy negative bed electrostatic activity of greater than −200 volts was observed.

Example 3

Seed Bed Treatment with Diethyl Zinc (DEZ)

As in above examples, the reactor was exposed to air and moisture and it was purged with nitrogen prior to charging the seed bed. A seed bed catalyzed by XCAT™ HP 100 catalyst of approximately 55 kg was charged to the reactor. The seed bed was dried by purging with nitrogen at 90° C. until the moisture level dropped to about 6.5 ppmv. Isopentane feed was initiated to the reactor until the molar percent in the gaseous phase reached 3.2%. Diethyl Zinc diluted in isopentane feed was initiated to the reactor until the concentration in the seed bed reached approximately 100 ppmw. Following circulation under above conditions for approximately 1 hour, the following reaction conditions were then established prior to catalyst feed: reactor temperature of 85° C., hexene to ethylene molar ratio of 0.019, hydrogen ppmv of about 170 and ethylene partial pressure of 210 psi. The reaction came on smoothly within approximately 15 minutes of initiating XCAT™ HP 100 feed to the reactor. The wall skin thermocouples showed no temperature excursions indicating no sheeting and the fluidized bulk density depression was negligible with low bed electrostatic activity of less than +/−50 volts. The reactor ran smoothly with no sheet formation.

Example 4

Seed Bed Treatment with DEZ and Continuity Additive

As in example 3, the reactor was exposed to air and moisture and it was purged with nitrogen prior to charging the seed bed. A seed bed catalyzed by XCAT™ HP 100 Catalyst of approximately 57 kg was charged to the reactor. The seed bed was dried by purging with nitrogen at 90° C. until the moisture level dropped to about 6 ppmv. Isopentane feed was initiated to the reactor until the molar percent reached 3.5%. Diethyl Zinc diluted in isopentane feed was initiated to the reactor until the concentration in the seed bed reached approximately 96 ppmw. Following circulation under above conditions for approximately 1 hour, a continuity additive slurry (10% by weight slurry of aluminum stearate in mineral oil) feed was initiated until the concentration in the seed bed has reached approximately 30 ppmw. The reactor was then vented and the following reaction conditions were then established prior to catalyst feed: reactor temperature of 85° C., hexene to ethylene molar ratio of 0.021, hydrogen ppmv of about 218 and ethylene partial pressure of 205 psi. The reaction came on smoothly within approximately 5 minutes of initiating XCAT™ HP 100 Catalyst feed to the reactor. The wall skin thermocouples showed negligible temperature excursions except for one minor excursion on a single thermocouple. There was no sheeting. There were also, no fluidized bulk density depression and negligible static activity. The reactor ran smoothly with no sheet formation.

Example 5

Seed Bed Treatment with Tri-Methyl Aluminum (TMA) and Continuity Additive

As in example 4 above, except for using TMA instead of DEZ. In this example, as in example 4, the reactor was exposed to air and moisture and it was purged with nitrogen prior to charging the seed bed. Following the loading the empty reactor with a seed bed, it was dried by purging with nitrogen at 90° C. until the moisture level dropped to about 3 ppmv. TMA diluted in isopentane feed was initiated to the reactor until the concentration in the seed bed reached approximately 225 ppmw (based on bed weight). Prior to initiation of reaction a continuity additive slurry (10% by weight slurry of aluminum stearate in mineral oil) feed was initiated until the concentration in the seed bed has reached approximately 30 ppmw. Following initiating XCAT™ HP 100 Catalyst feed to the reactor, the reaction came on smoothly, however, fluidized bulk density depression was observed at over 10 lb/cf. Also, the wall skin thermocouples showed temperature excursion of approximately 12° C. above bed temperature most likely indicative of resin sintering.

Example 6

Seed Bed Treatment with Tri-Ethyl Aluminum (TEAl) and Continuity Additive

As in example 5 above, except for using TEAL instead of DEZ or TMA. In this example, as in example 4, the reactor was exposed to air and moisture and it was purged with nitrogen prior to charging the seed bed. Following the loading the empty reactor with a seed bed, it was dried by purging with nitrogen at 90° C. until the moisture level dropped to about 7 ppmv. TEAL diluted in isopentane feed was initiated to the reactor until the concentration in the seed bed reached approximately 90 ppmw (based on bed weight). Prior to initiation of reaction a continuity additive slurry (10% by weight slurry of aluminum stearate in mineral oil) feed was initiated until the concentration in the seed bed has reached approximately 30 ppmw. Following initiating XCAT™ HP 100 Catalyst feed to the reactor, the reaction came on smoothly, however a fluidized bulk density depression of about 3 to 4 lb/cf was observed. Also, the wall skin thermocouples showed temperature excursion of approximately 5 to 6° C. above bed temperature mostly likely indicative of resin sintering.

Overall, DEZ was found to be better for seed bed treatment than TEAL or TMA, with respect to bulk density depression and temperature excursions. Without being bound by theory, it is believed that DEZ demonstrates an increased mobility in the reactor that provides for better scavenging attributes than TMA and TEAl. This may be due to at least in part the higher vapor pressure of DEZ than both TEAL and TMA (19.65 mmHg at 25° C. for DEZ; 12.1 mmHg for TMA; and 0.025 mmHg for TEAL). In particular, it is believed that the higher partial pressure of DEZ allows it to react with impurities in both their gaseous and adsorbed states and (e.g., wall adsorbed impurities) at much faster rates than other organometallic compounds such as TMA and TEAl. This is especially important in case were the reactor may have been hydroblasted as shown in the Examples below.

Example 7

Seed Bed Treatment with DEZ and High Moisture Level

As in example 4, the reactor was exposed to air and moisture and it was purged with nitrogen prior to charging the seed bed. A seed bed catalyzed by chrome based catalyst of approximately 59 kg was charged to the reactor. The seed bed was dried by purging with nitrogen at 90° C. until the moisture level reached about 18 ppmv. Unlike previous parts, no isopentane or continuity additive treatment was carried out except for seed bed treatment with diethyl zinc. Diethyl zinc (diluted in isopentane) feed was initiated to the reactor until the concentration in the seed bed reached approximately 200 ppmw. Following circulation under above conditions for approximately 1 hour, the reactor was then vented down and the following initial reaction conditions were established prior to catalyst feed: reactor temperature of 85° C., hexene to ethylene molar ratio of 0.021, hydrogen ppmv of about 240 and ethylene partial pressure of 212 psi. The reaction came on smoothly within approximately 15 minutes of initiating XCAT™ HP Catalyst 100 feed to the reactor. The wall skin thermocouples showed negligible temperature excursions, and there was no fluidized bulk density depression. The static level was negligible. The reactor ran smoothly with no sheet formation.

Example 8

Seed Bed Treatment Following Hydroblast Using DEZ Pretreatment

The UNIPOL™ pilot plant reactor had experienced a dome sheet and hydroblasting with high pressure water was required to remove the dome sheet. The high pressure water requires a much longer drying time due to the massive amounts of water used in the hydroblasting process. Following reassembly of the reactor, the empty reactor was heated up to about 85° C. with nitrogen and purged to remove excessive moisture. The reactor was then vented down and a seed bed of approximately 385 kg was charged to the reactor by transferring granular resin made previously from a charging vessel to the reactor. Following charging of the seed bed to the reactor, high pressure nitrogen was introduced and the seed bed was fluidized. The bed temperature was raised to approximately 85° C. and the seed bed was flow purged with $N_2$ at this temperature until the moisture (water) level was about 14 ppmv (in the vapor phase). The total drying time was 14 hours. Diethyl zinc diluted in isopentane feed at 20% was initiated to the reactor until the concentration in the seed bed reached approximately 120 ppmw. Following circulation for 1 hour, a continuity additive slurry feed (20% by weight of aluminum distearate in mineral oil) was initiated until the concentration in the seed bed has reached approximately 30 ppmw. The following reaction conditions were then established prior to catalyst feed: reactor temperature of 85° C., hexene to ethylene molar ratio of 0.008, hydrogen ppmv of about 1120, and ethylene partial pressure of 200 psi. XCAT™ EZ 100 Metallocene Catalyst feed was initiated to the reactor. The reaction came on immediately after initiating catalyst feed and required 24 hours to reach steady state. There was no change in the fluidized bulk density. Total start up time including the dry down period was 38 hours or 1.6 days.

Example 9

Comparative—Seed Bed Treatment Following Hydroblast without DEZ Pretreatment

As in Example 8 the pilot plant reactor had experienced a dome sheet and hydroblasting with high pressure water was applied. Following reassembly of the reactor, the empty reactor was heated up to about 85° C. with nitrogen and purged to remove excessive moisture. The reactor was then vented down and a seed bed of approximately 385 kg was charged to the reactor by transferring granular resin made previously from a charging vessel to the reactor. Following charging of the seed bed to the reactor, high pressure nitrogen was introduced and the seed bed was fluidized. The bed temperature was raised to approximately 85° C. and the seed bed was flow purged with $N_2$ at this temperature until the moisture (water) level was about 4 ppmv (in the vapor phase). The total drying time was 47 hours. A continuity additive slurry feed (20% by weight of aluminum distearate in mineral oil) was initiated until the concentration in the seed bed has reached approximately 30 ppmw. The following reaction conditions were then established prior to catalyst feed: reactor temperature of 79° C., hexene to ethylene molar ratio of 0.010, hydrogen ppmv of about 1120, and ethylene partial pressure of 220 psi. XCAT™ EZ 100 Metallocene Catalyst feed was initiated to the reactor. The reaction came on sluggishly after initiating catalyst feed and required 48 hours to reach steady state. Also, the fluidized bulk density dropped by 4 lb/cf before recovering approximately 32 hours after establishing reaction. Total start up time including the dry down period was 95 hours or 4 days. Compared to the DEZ case of Example 8, 57 more hours or 2.4 more days was required to reach steady state and a drop in bulk density was observed.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents cited herein are fully incorporated by reference for all jurisdictions in which such incorporation is permitted and to the extent such disclosure is consistent with the description of the present invention. While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for preparing a reactor for the performance of a polymerization reaction, the method comprising providing at least one seed bed in the reactor; wherein the at least one seed bed comprises at least one organometallic compound and polymer particles; and wherein the seed bed is further contacted with at least one hydrocarbon such that the at least one hydrocarbon is present in the seed bed in a range of from 2 to 8 mole percent in the gaseous phase.

2. The method of claim 1, wherein the at least one organometallic compound is represented by the formula:

$$M_aR$$

wherein M is a Group 1, 2, 12, or 13 atom, R is independently selected from $C_{1-20}$ alkenyls, $C_{1-20}$ alkyl group, $C_{1-20}$ alkoxys, $C_{6-20}$ aryl groups, alkylaryl groups, $C_{5-25}$ cyclopentadienyls, and mixtures of two or more of the foregoing; and is a valence state sufficient to balance M.

3. The method of claim 2, wherein M is Mg, Zn, Li, Al, Na, or K.

4. The method of claim 1, wherein the at least one organometallic compound comprises triisobutylaluminium, tripropylaluminium, tributylaluminium, dimethylchloroaluminium, dimethylisobutylaluminium, dimethylethylaluminium, diethylchloroaluminium, triisopropylaluminium, tri-s-butylaluminium, tricyclopentylaluminium, tripentylaluminium, triisopentylaluminium, trihexylaluminium, ethyldimethylaluminium, methyldiethylaluminium, triphenylaluminium, tri-p-tolylaluminium, dimethylaluminiummethoxide, dimethylaluminiumethoxide, methyllithium, butyllithium, di-n-propylzinc, di-n-butylzinc, diethyl zinc, trimethylboron, triethylboron, triisobutylboron, tripropylboron, tributylboron, or mixtures thereof.

5. The method of claim 1, wherein the at least one organometallic compound present in the seed bed ranges from 25 to 250 ppmw based upon the total weight of the seed bed.

6. The method of claim 1, wherein the hydrocarbon comprises isopentane.

7. The method of claim 1, wherein the seed bed is further contacted with at least one continuity additive, wherein the continuity additive comprises a carboxylate metal salt, an amine containing blend composition, or mixtures thereof.

8. The method of claim 7, wherein the carboxylate metal salt is a metal stearate selected from aluminium stearate and aluminium distearate.

9. The method of claim 7, wherein the at least one continuity additive present in the seed bed ranges from 20 to 40 ppmw based upon the total weight of the seed bed.

10. A method comprising contacting the seed bed of claim 1 with a catalyst system and one or more olefin monomers to produce a polymerization reaction in at least one reactor to produce a polyolefin product.

11. The method of claim 10, where the olefin monomers comprise ethylene and one or more of $C_3$-$C_{18}$ alpha-olefin monomers.

12. The method of claim 10, wherein the method further comprises contacting the seed bed, the catalyst system, and the one or more olefin monomers with hydrogen.

13. The method of claim 10, wherein the catalyst system comprises at least one metallocene catalyst.

14. The method of claim 10, wherein the seed bed is made from polymer particles that are made from a different catalyst system and/or under different polymerization conditions from that of the polyolefin product.

15. The method of claim 10, wherein the seed bed is made from polymer particles that are made from the same catalyst system and/or under the same polymerization conditions from that of the polyolefin product.

16. The method of claim 10, wherein the seed bed is subjected to a purging step with an inert gas prior to initiation of the polymerization reaction.

17. The method of claim 10, wherein the polymerization reaction is initiated in 25 minutes or less of the contacting of the seed bed, the catalyst system, and the one or more olefin monomers.

18. The method of claim 10, wherein the at least one reactor comprises a fluidized bed and the polymerization reaction occurs in the at least one reactor having wall skin thermocouples indicating that the wall temperature is within ±2° C. of the temperature of the fluidized bed.

19. The method of claim 10, wherein the polymerization reaction occurs in the presence of the seed bed having a water concentration of 7 ppmv or greater in the polymerization reactor gaseous phase.

* * * * *